US012153164B2

(12) United States Patent
Laverne et al.

(10) Patent No.: US 12,153,164 B2
(45) Date of Patent: Nov. 26, 2024

(54) SYSTEM AND METHOD FOR OPERATING A RETRACTABLE SENSOR OF AN AUTONOMOUS VEHICLE

(71) Applicant: Argo AI, LLC, Pittsburgh, PA (US)

(72) Inventors: Michel Laverne, Pittsburgh, PA (US); Morgan Wagner, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 1029 days.

(21) Appl. No.: 17/090,998

(22) Filed: Nov. 6, 2020

(65) Prior Publication Data

US 2022/0146632 A1 May 12, 2022

(51) Int. Cl.
*B60R 11/04* (2006.01)
*B60R 11/02* (2006.01)
(Continued)

(52) U.S. Cl.
CPC ........ *G01S 7/4813* (2013.01); *B60R 11/0258* (2013.01); *B60R 11/04* (2013.01);
(Continued)

(58) Field of Classification Search
CPC ...... G01S 7/4813; G01S 17/931; G01S 17/86; G01S 17/08; B60R 11/0258; B60R 11/04;
(Continued)

(56) References Cited

U.S. PATENT DOCUMENTS

| 6,906,684 B2 | 6/2005 | Turner |
| 7,896,113 B1 * | 3/2011 | Ramirez ............... B25J 19/023 |
| | | 180/9 |

(Continued)

FOREIGN PATENT DOCUMENTS

| WO | 20070050406 A1 | 5/2007 |
| WO | 20180165522 A1 | 9/2018 |
| WO | 2019183981 A1 | 10/2019 |

OTHER PUBLICATIONS

Tarko, A. et al., "TScan: Stationary LiDAR for Traffice and Safety Studies-Object Detection and Tracking," Indiana Department of Transportation and Purdue University, SPR-3831, Report No. FHWA/IN/JTRP-2016/24, DOI: 10.5703/1288284316347.

(Continued)

*Primary Examiner* — Anne Marie Antonucci
*Assistant Examiner* — Jingli Wang

(57) ABSTRACT

A method of operating a vehicle having a roof-mounted sensor apparatus includes, by a retractable sensor, capturing data about an environment along a path on which the vehicle is traveling. The method includes, by a location sensor, determining a location of the vehicle along the path. By a computing device of the vehicle, the method includes accessing a map that corresponds to the location and the path, determining that a structure having a minimum clearance is ahead at an imminent location on the path, and determining that the minimum clearance is less than or equal to an elevation of the retractable sensor. The method includes prior to the vehicle arriving at the imminent location, automatically operating a lifting element of the sensor apparatus to withdraw the retractable sensor into the sensor apparatus so that the elevation of the retractable sensor is less than the minimum clearance of the structure.

17 Claims, 12 Drawing Sheets

(51) Int. Cl.
  *B60S 1/56* (2006.01)
  *G01S 7/481* (2006.01)
  *G01S 17/08* (2006.01)
  *G01S 17/86* (2020.01)
  *G01S 17/931* (2020.01)
  *B60R 11/00* (2006.01)

(52) U.S. Cl.
  CPC ............ *B60S 1/566* (2013.01); *G01S 17/08* (2013.01); *G01S 17/86* (2020.01); *G01S 17/931* (2020.01); *B60R 2011/0082* (2013.01); *B60R 2011/0092* (2013.01)

(58) Field of Classification Search
  CPC ..... B60R 2011/0082; B60R 2011/0092; B60S 1/566
  See application file for complete search history.

(56) References Cited

U.S. PATENT DOCUMENTS

| | | |
|---|---|---|
| 10,704,864 B1 | 7/2020 | Fougnies et al. |
| 2005/0093766 A1 | 5/2005 | Turner |
| 2013/0222592 A1* | 8/2013 | Gieseke ........... G08G 1/096708 |
| | | 348/148 |
| 2015/0130939 A1 | 5/2015 | Moulton |
| 2017/0356769 A1 | 12/2017 | Williams et al. |
| 2018/0009418 A1* | 1/2018 | Newman ................... B08B 3/02 |
| 2020/0142426 A1 | 5/2020 | Gist, IV et al. |
| 2020/0209391 A1* | 7/2020 | Hu ........................... G01S 17/42 |
| 2021/0053678 A1* | 2/2021 | Schütz ................. B25J 11/0085 |
| 2021/0058555 A1 | 2/2021 | Xu et al. |

OTHER PUBLICATIONS

Telescopic Masks, RVALM, https://www.rvalm.ca/en/telecopic-masts, Sep. 1, 2020.

* cited by examiner

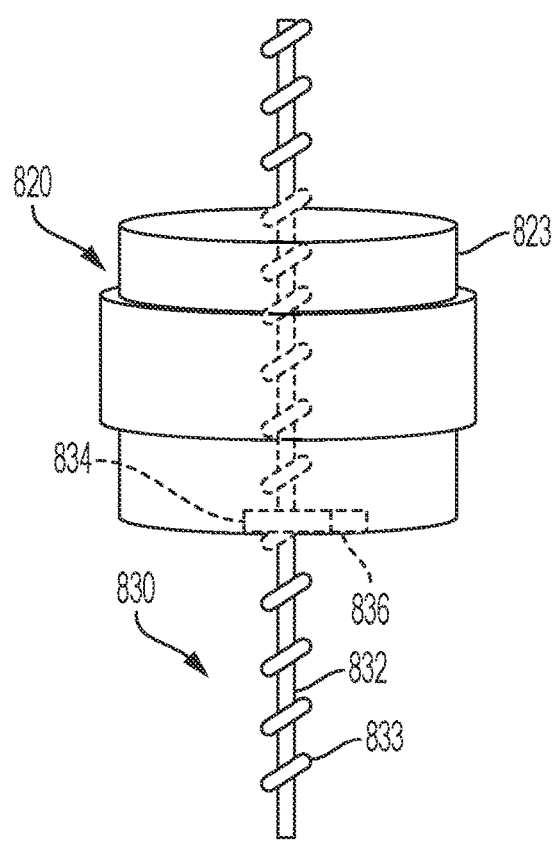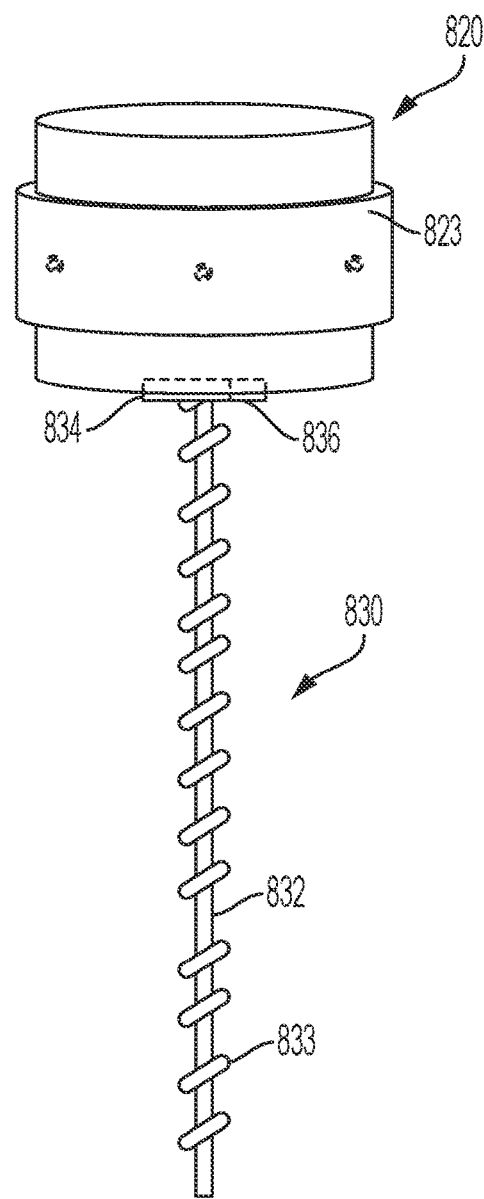
FIG. 8A
FIG. 8B

SYSTEM AND METHOD FOR OPERATING A RETRACTABLE SENSOR OF AN AUTONOMOUS VEHICLE

BACKGROUND

The document describes systems and methods that are directed to lifting a retractable sensor which is used by an autonomous vehicle to navigate along a driven path.

Autonomous vehicles rely on an extensive set of sensing modalities to control various autonomous driving functions of the vehicle. An autonomous vehicle may include various roof-mounted sensors that are required to capture ground coverage (i.e., the point on the ground where the sensor's field of view intersects the ground plane), prevent self-occlusion from the vehicle, and maintain the overall vehicle height below limits imposed by the infrastructure (such as parking garages). These sensor requirements can conflict with each other. For example, obtaining ground coverage can be achieved in part by raising the height of some of the sensors. However, increasing the sensor's elevation increases the vehicle's height which imposes a collision risk with low overhanging infrastructure. Accordingly, to safely and reliably operate the vehicle, the sensor set needs to satisfy multiple requirements with engineering solutions that can be fundamentally incompatible.

This document describes methods and systems that are directed to addressing at least some of the issues above.

SUMMARY

In some embodiments, a method of operating a vehicle having a roof-mounted sensor apparatus is provided. The method may include, by a retractable sensor of the roof-mounted sensor apparatus, capturing data about an environment along a path on which the vehicle is traveling. The method may include, by a location sensor of the vehicle, determining a location of the vehicle along the path. By a computing device of the vehicle, the method may include, accessing a map that corresponds to the location and the path, determining that a structure having a minimum clearance is ahead at an imminent location on the path, and determining that the minimum clearance is less than or equal to an elevation of the retractable sensor. By a computing device of the vehicle, the method may include prior to the vehicle arriving at the imminent location, automatically operating a lifting element of the roof-mounted sensor apparatus to withdraw the retractable sensor into a housing of the sensor apparatus so that the elevation of the retractable sensor is less than the minimum clearance of the structure.

In various embodiments, the retractable sensor may include a light detection and ranging (LiDAR) sensor.

In various embodiments, the method may further include, by a camera of the vehicle, capturing images of the imminent path portion of the path. The method may further include, by the computing device of the vehicle, detecting an object of interest in the images, classifying the object of interest, and controlling motion of the vehicle along the imminent path portion to avoid a collision with the classified object of interest.

In various embodiments, the method may further include, by the computing device of the vehicle, storing minimum clearances of structures having an overhanging portion over a road of a map.

In various embodiments, the method may further include, by the computing device of the vehicle, identifying whether a structure on the path has a variable clearance. The method may further include, by the computing device of the vehicle, performing a minimum clearance measurement of the identified structure, in response to determining the structure has the variable clearance; and updating the stored minimum clearance with the measured minimum clearance.

In various embodiments, the method may further include, by the computing device of the vehicle, determining a current location of the vehicle. The method may further include, by the computing device of the vehicle, based on the determined current location, adjusting the lifting element to retract or extend the retractable sensor relative to a sensor housing of the roof-mounted sensor apparatus.

In various embodiments, the method may further include, by the computing device of the vehicle, determining that the data captured by the retractable sensor exhibits a quality condition indicating that a lens structure of the retractable sensor is dirty. The method may further include, by the computing device of the vehicle, in response to determining that the data exhibits the quality condition, adjusting the lifting element to retract the retractable sensor into the housing. By a sensor cleaning element in the housing, the method may include cleaning the lens as the retractable sensor retracts into the housing.

In various embodiments, the method may further include, by the computing device of the vehicle, determining a cleaning opportunity to clean a lens structure of the retractable sensor. The method may further include, by the computing device of the vehicle, based on the determined cleaning opportunity, adjusting the lifting element to retract the retractable sensor into the housing so that the lens structure is adjacent to a cleaning element in the housing; and operating the lifting element to move the lens along the cleaning element.

In various embodiments, the method may further include, by the computing device of the vehicle, determining a hibernation mode or a parked mode of the vehicle. The method may further include, by the computing device of the vehicle, based on determining the vehicle is in the hibernation mode or the parked mode, adjusting the lifting element to retract the retractable sensor into the housing.

In various embodiments, the adjusting of the lifting element may include moving a lens of the retractable sensor adjacent to a cleaning element in the housing to clean the lens with the cleaning element.

In some embodiments, a roof-mounted sensor system for an autonomous vehicle is provided. The sensor system may include a system housing that is configured to mount to a roof of a vehicle. The housing may include a top aperture and a front-facing aperture and a retractable sensor apparatus. The retractable sensor apparatus may include a retractable sensor body with a first sensor that, when positioned in an operational position, extends from the top aperture out of the housing, and a lift apparatus that is operational to move the retractable sensor body between the operational position and a retracted position that is at least partially within the housing. The retractable sensor apparatus may include a motor that is operable to operate the lift apparatus and a second sensor that is positioned within the system housing and configured to capture data through the front-facing aperture.

In various embodiments, the retractable sensor apparatus may further include a cleaning element that is positioned to clean the retractable sensor body when the retractable sensor body is moved from the operational position to the retracted position.

In various embodiments, the cleaning element may include one or more of the following: a squeegee that is positioned to contact and scrape against a lens structure of the LiDAR sensor when the LiDAR sensor is moved between the operational position and the retracted position; or a brush that is positioned to contact and brush the lens structure of the LiDAR sensor when the LiDAR sensor is moved between the operational position and the retracted position.

In various embodiments, the lift apparatus may include one or more of the following: one or more telescoping support posts; a scissor lift; or a helical support structure.

In various embodiments, the second sensor may include a camera that is configured to capture images through the front-facing aperture. The system may further include a sensor housing that is formed within the system housing and configured to house the retractable sensor and lift apparatus.

In various embodiments, the system may further include a retractable sensor controller communicatively coupled to the retractable sensor apparatus. The controller may be configured to access a map that corresponds to a location on a path driven by the autonomous vehicle, determine that a structure having a minimum clearance is ahead at an imminent location of the path and determine that the minimum clearance is less than or equal to an elevation of the retractable sensor. The controller may be configured to, prior to the vehicle arriving at the imminent location, cause the motor to automatically operate the lift apparatus to withdraw the retractable sensor into the sensor housing so that the elevation of the retractable sensor is less than the minimum clearance of the structure.

In various embodiments, the system may further include a cleaning element mounted to an interior surface of the sensor housing. The retractable sensor controller may be further configured to determine a cleaning opportunity to clean a lens structure of the retractable sensor. The retractable sensor controller may be further configured to, based on the determined cleaning opportunity, adjust the lifting element to retract the retractable sensor into the sensor housing so that the lens structure is adjacent to the cleaning element in the housing. The retractable sensor controller may be further configured to operate the lifting element to move the lens structure along the cleaning element.

In various embodiments, the retractable sensor controller may be further configured to determine a hibernation mode or a parked mode of the vehicle. The retractable sensor controller may be further configured to, based on determining that the vehicle is in the hibernation mode or the parked mode, adjust the lifting element to retract the retractable sensor into the sensor housing.

In various embodiments, the retractable sensor controller may be further configured to detect activation of manual control of the retractable sensor apparatus. The retractable sensor controller may be further configured to, based on detecting the activation of the manual control, control the lifting element to retract or extend the retractable sensor relative to the sensor housing.

BRIEF DESCRIPTION OF THE DRAWINGS

FIGS. 8A-8B are examples of the retractable sensor apparatus in retracted and operational positions, respectively, using with a helical support structure as a lifting element.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. When used in this document, the term "comprising" (or "comprises") means "including (or includes), but not limited to." When used in this document, the term "exemplary" is intended to mean "by way of example" and is not intended to indicate that a particular exemplary item is preferred or required.

Other terms that are relevant to this disclosure are defined at the end of this Detailed Description section.

Figure 1A:
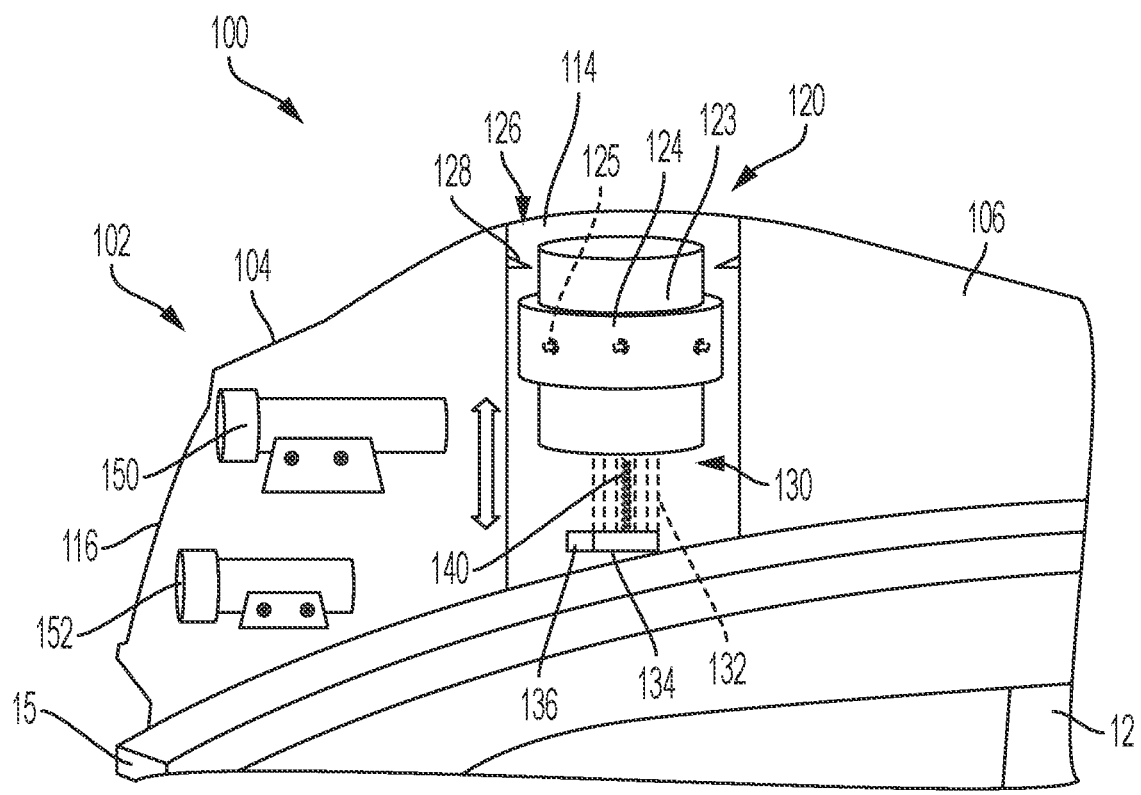
FIG. 1A is an example of a roof-mounted retractable sensor system for an autonomous vehicle with a retractable sensor apparatus in a fully retracted position, in accordance with various embodiments of the present disclosure.
Figure 1B:
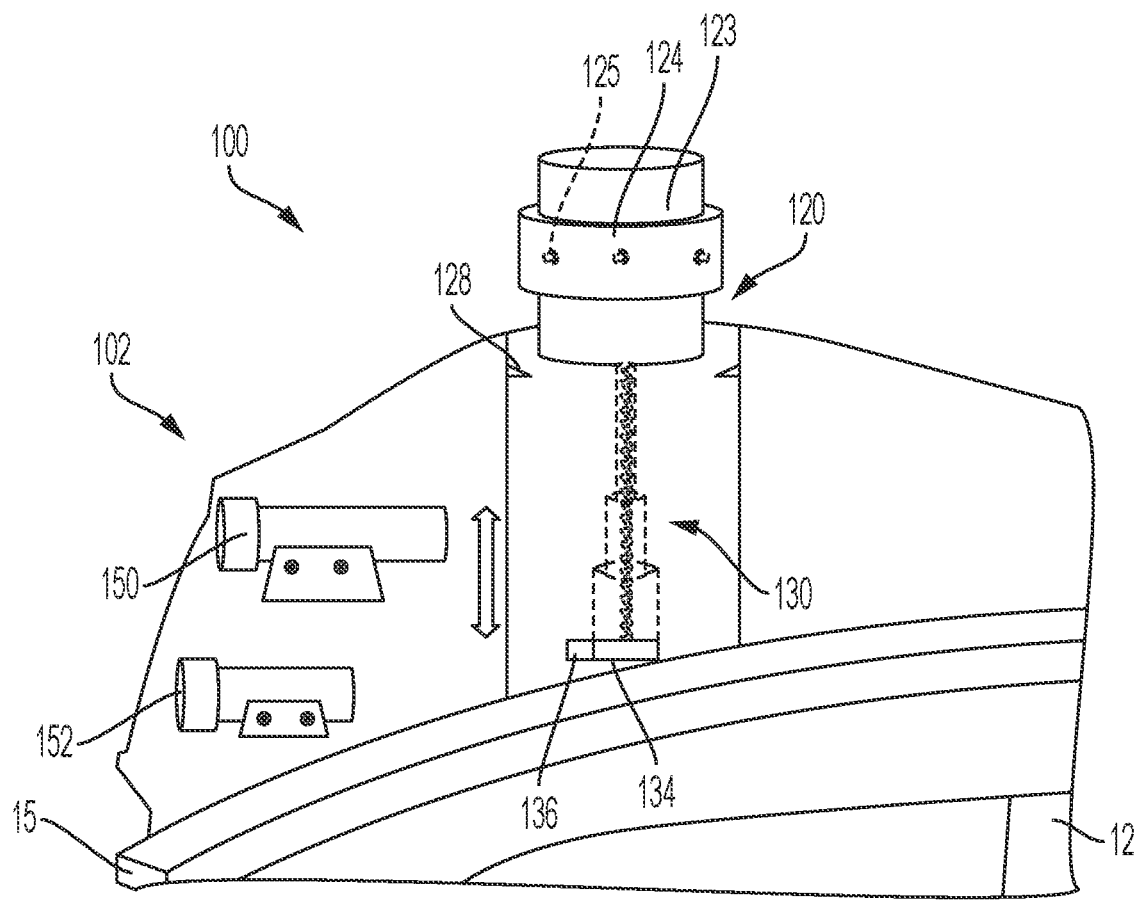
FIG. 1B is an example of a roof-mounted retractable sensor system for an autonomous vehicle with the retractable sensor apparatus in an operational position, in accordance with various embodiments of the present disclosure.

FIGS. 1A-1B are examples of a roof-mounted retractable sensor system 100 for an autonomous vehicle 12 with the retractable sensor apparatus 120 in a fully retracted position and an operational position, respectively, in accordance with various embodiments. The roof-mounted sensor system 100 may include a roof-mounted housing 102 configured to be mounted to a roof 15 of a vehicle 12. The roof-mounted housing 102 may include an exterior housing surface 104 that forms an enclosure with an interior cavity 106. The housing 102 may include a top aperture 114 and a front-facing aperture 116.

The sensor system 100 may include a retractable sensor apparatus 120 that is configured to be installed in the interior cavity 106. By way of non-limiting example, the retractable sensor apparatus 120 may be a light detection and ranging (LiDAR) sensor that, when positioned in an operational position, extends from and through the top aperture 114 and out of the housing 102, as best seen in FIG. 1B.

The retractable sensor apparatus 120 may include a sensor body 123 that is configured to house one or more sensors 125, denoted in phantom for illustrative purposes. The retractable sensor apparatus 120 may include a lens structure 124 that includes any number of lenses. By way of non-limiting example, the one or more sensors 125 are behind lens structure 124 through which the one or more sensors 125 receive a sensed signal. By way of non-limiting example, the sensors 125 may include emitters and receivers. The one or more sensors 125 are retractable sensors. The sensed signal may be representative of pulsed laser reflections to form a three-dimensional point cloud. The three-dimensional point cloud may be representative of a captured image.

The retractable sensor apparatus 120 may include a sensor housing 126 that is configured to be integrated with the interior cavity 106. The sensor housing 126 may be aligned with the top aperture 114 so that the sensors 125 may move in and out of the sensor housing 126 through the top aperture 114. The retractable sensor apparatus 120 may include a sensor cleaning element 128 that is located within the sensor housing 126 and is configured to clean the lens structure 124, as will be described more detail in relation to FIGS. 2A-2B. The retractable sensor apparatus 120 may include any number of sensor cables 140 that are electrically connected to the sensors 125 to provide power and/or data communications capabilities. The cables 140 are shown as a coiled cable configured to expand and contract as the retractable sensor apparatus 120 is lifted and retracted. It should be understood that other cable configurations may be used.

The retractable sensor apparatus 120 may include a lift apparatus 130 that is operational to move the sensors 125 between the operational position (FIG. 1B) and a retracted position (FIG. 1A). The lift apparatus 130 may include a lifting element 132 coupled to a motor 134 that is operable to cause the lifting element 132 to lift. In various embodiments, the lifting element 132 may include one or more telescoping support posts, as shown in FIGS. 1A-1B, a scissor lift (as in FIG. 9), or a helical support structure (as in FIGS. 8A-8B). The lift apparatus 130 may include a position tracker 136 that is configured to track a position, such as a vertical position, of the sensor body 123 and/or lens structure 124 relative to the height of the lifting element 132. By way of non-limiting example, the position tracker 136 may include a rotary encoder lead screw, an optical sensor or other detectors which may be embedded into the interior of the sensor housing 126.

The sensor system 100 may include an additional roof-mounted sensor 150 and/or 152 positioned in the enclosure of the housing 102 to capture data through the front-facing aperture 116. The roof-mounted sensor 150 and/or 152 may include a camera or imaging device. The roof-mounted sensor 150 and/or 152 has a field of view which extends a forward distance from the vehicle 12 to capture data of the environment and, in some instances, an imminent structure or obstruction. It should be understood, that the sensor system 100 may include additional roof-mounted sensors incorporated into the housing 102 or mounted to the roof 15 of the vehicle 12 using another housing. The sensor system 100 may communicatively interface with at least one autonomous vehicle navigation controller 320 and/or retractable sensor controller 321, as will be described in relation to FIG. 3, for controlling the capturing of data by the sensor system 100.

Figure 2A:
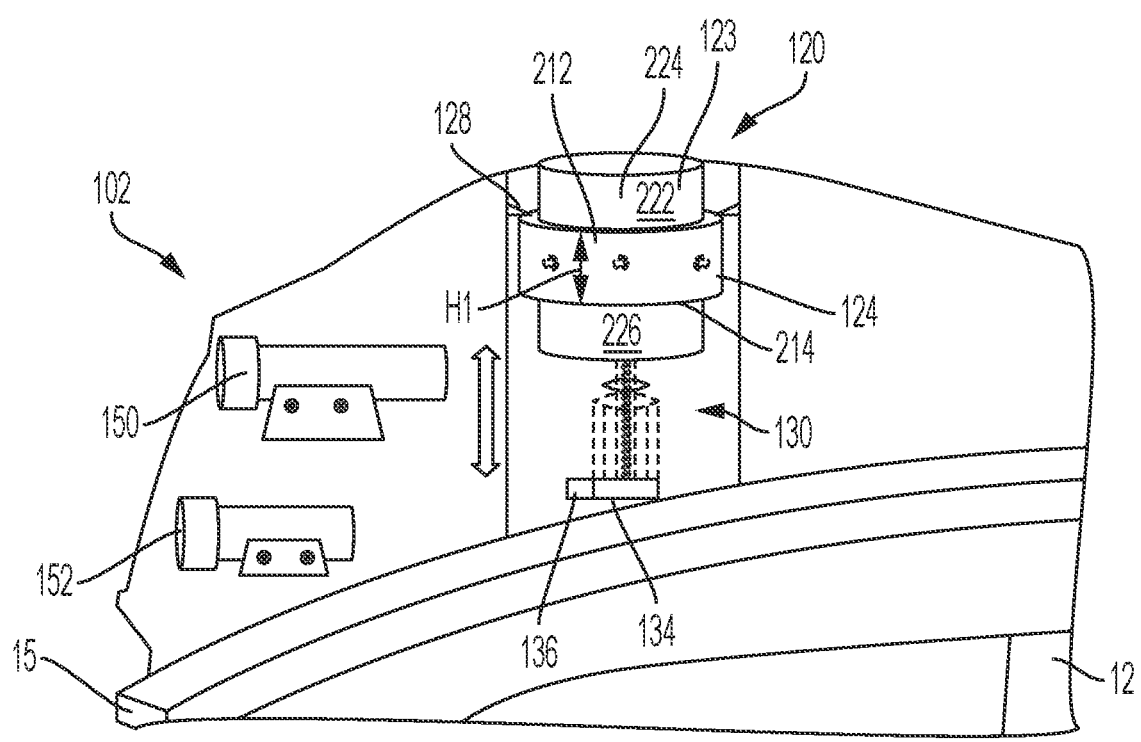
FIGS. 2A-2B are examples of the retractable sensor apparatus of FIG. 1A in first and second cleaning positions, in accordance with various embodiments of the present disclosure.
Figure 2B:
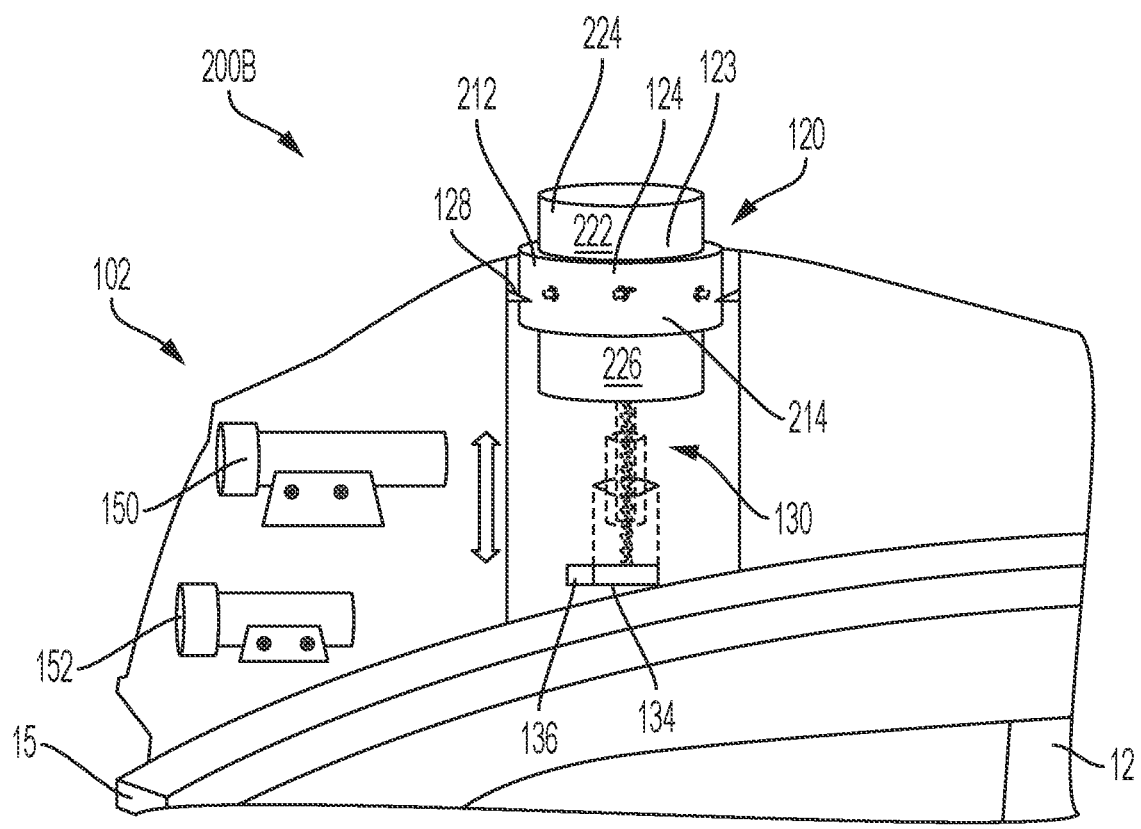

FIGS. 2A-2B are examples of the retractable sensor apparatus 120 of FIG. 1A in first and second cleaning positions, in accordance with various embodiments. The sensor body 123 includes a top section 222 and a bottom section 226. The lens structure 124 is configured to be positioned between the top section 222 and the bottom section 226. In some embodiments, the lens structure 124 has a height H1, such as a vertical length, measured between a top edge 212 and a bottom edge 214 of lens structure 124. In the operational position of FIG. 1B, the sensor body 123 is raised out of the housing 102 and sensor housing 126 such that at least the bottom edge 214 of lens structure 124 is above the highest plane of housing 102 to prevent obstructing the view through the lens. Specifically, in the operational position at least a portion of the bottom section 226 may elevated above the highest plane of housing 102. The top section 222 includes a top surface 224 which may be used to define an elevation of the retractable sensor apparatus 120, when the top surface 224 is above the plane of the top aperture 114.

In FIG. 2A, the retractable sensor apparatus 120 is shown in a first cleaning position that may position the sensor body 123 so that the top edge 212 of lens structure 124 is adjacent to and in contact with the cleaning element 128 for performing a cleaning operation. In FIG. 2B, the retractable sensor apparatus 120 is shown in a second cleaning position that may position the sensor body 123 so that the lens structure 124 is adjacent to and in contact with the cleaning element 128 for performing a cleaning operation on the adjacent area of the lens structure 124. As should be understood, other cleaning positions may extend from that shown in FIG. 2A to a position in which cleaning element 128 contacts the bottom edge 214 of the lens structure 124. There may be any number of intermediate cleaning positions to clean the lens structure 124 by the cleaning element 128 along the lens structure 124 and/or sensor body 123 as the sensor body 123 is moved up and down by the lift apparatus 130. In addition, the The cleaning element 128 may include a squeegee, scraper and/or blade that is positioned to contact and scrape against at least an external surface of the lens structure 124 when the retractable sensor apparatus 120 is moved between the operational position (FIG. 1B) and the retracted position (FIG. 1A). The cleaning element 128 is arranged circumferentially around an interior surface of the sensor housing 126. The cleaning element 128 may protrude from the interior surface toward a center of housing 126 to contact at least the lens structure 124 as it passes by the cleaning element 128. The cleaning element 128 may include a brush that is positioned to contact and brush at least the exterior surface of the lens structure 124 when the sensor body 123 is moved between the operational position (FIG. 1B) and the retracted position (FIG. 1A). In some embodiments, the brush may be rotatable so that when the brush contacts the lens, the brush may rotate on the exterior surface of the lens. The brush may include multiple brushes so that selected brushes are individually activated to rotate on the exterior surface of the lens at those areas which may be determined to have dirt adhering to the lens. In various embodiments, the cleaning element 128 may include a nozzle that is positioned to direct pressurized air toward at least the lens structure 124 when the sensor body 123 is moved between the operational position (FIG. 1B) and the retracted position (FIG. 1A). If the cleaning element is a nozzle, a source of air needs to be provided and actuated appropriately.

Figure 3:
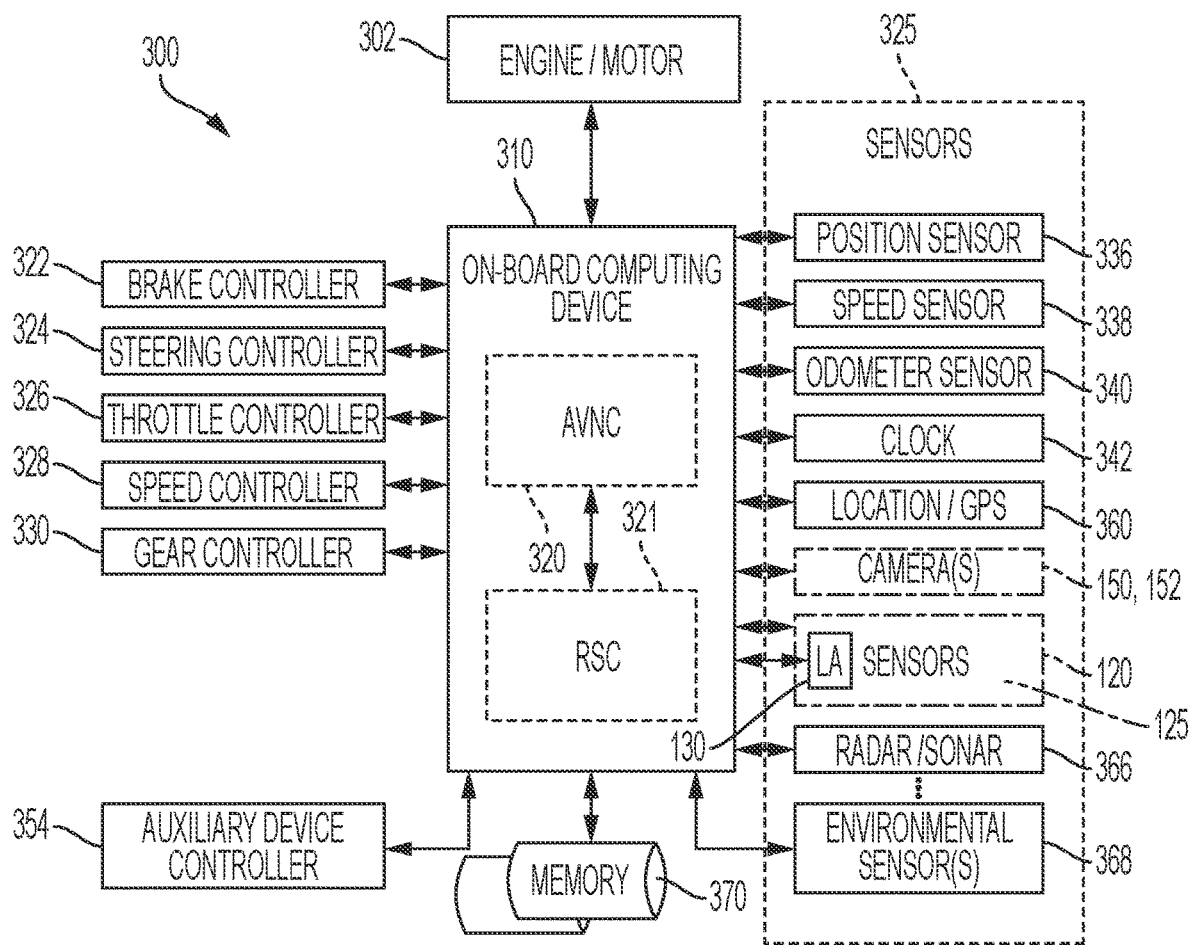
FIG. 3 is an example of a system architecture for a vehicle, such as an autonomous vehicle, to control at least one autonomous navigation operation, in accordance with various embodiments of the present disclosure.

FIG. 3 illustrates a system architecture 300 for a vehicle 12, such as an autonomous vehicle or semi-autonomous vehicle. The vehicle 12 may include an engine or motor 302 and various sensors for measuring various parameters of the vehicle and/or its environment. Operational parameter sensors 325 that are common to both types of vehicles include, for example: a position sensor 336 such as an accelerometer, gyroscope and/or inertial measurement unit; a speed sensor 338; and an odometer sensor 340. The vehicle 12 also may have a clock 342 that the system architecture 300 uses to determine vehicle time during operation. The clock 342 may be encoded into the vehicle on-board computing device 310, it may be a separate device, or multiple clocks may be available.

The vehicle 12 also may include various sensors that operate to gather information about the environment in which the vehicle is traveling. These sensors may include, for example: a location sensor 360 such as a GPS device; object detection sensors, such as one or more cameras 150, 152; a retractable sensor apparatus 120 (i.e., LiDAR sensor), a radar and/or a sonar system 366. In this disclosure, at least the one or more cameras 150, 152 and a retractable sensor apparatus 120 (i.e., LiDAR sensor) are part of the roof-mounted sensor system 100 described above in relation to FIGS. 1A-1B and 2A-2B. The cameras 150, 152 and a retractable sensor apparatus 120 are denoted in dash, dot, dot boxes to represent that these sensors are part of the roof-mounted sensor system 100. It should be understood, that any of the object detection sensors may be part of the roof-mounted sensor system 100, in various embodiments.

The sensors 325 also may include environmental sensors 368 such as a precipitation sensor and/or ambient temperature sensor. Precipitation may include, without limitation, rain, drizzle, snow, hail or sleet. The sensors 325 may provide data used by the on-board computing device 310 for determining at least one autonomous navigation operation. The object detection sensors may enable the vehicle 12 to detect objects that are within a given distance or range of the vehicle 12 in any direction, while the environmental sensors collect data about environmental conditions within the vehicle's area of travel. The system architecture 300 may also include one or more cameras 150, 152 for capturing images of the environment. As should be understood, one or more of the sensors 325 may be part of the vehicle but still necessary for autonomous control of the navigation of the vehicle. Additionally, it should be understood, that the sensors 325 may include additional sensors that are not disclosed herein. The vehicle may include other sensors (not shown) such as convenience sensors to equipping the vehicle with those convenience features to aid a human driver.

The on-board computing device 310 may include an autonomous vehicle navigation controller (AVNC) 320 configured to control the navigation of the vehicle along a planned route, such as along streets, roads, bridges, and under overhanging structures, in response to real-time information from the various sensors 325. During operations, information is communicated from the sensors 325 to the autonomous vehicle navigation controller 320 of the on-board computing device 310. The autonomous vehicle navigation controller 320 analyzes the data captured by the sensors and optionally controls operations of the vehicle based on results of the analysis. For example, based on the analysis, the autonomous vehicle navigation controller 320 may cause the on-board computing device 310 to control one or more of: braking via a brake controller 322; direction via a steering controller 324; speed and acceleration via a throttle controller 326 (in a gas-powered vehicle) or a motor speed controller 328 (such as a current level controller in an electric vehicle); a differential gear controller 330 (in vehicles with transmissions); and/or other controllers such as an auxiliary device controller 354.

Geographic location information may be communicated from the location sensor 360 to the on-board computing device 310, which may then access a map from memory 370 of the environment that corresponds to the location information to determine known fixed features of the environment such as streets, buildings, stop signs, stop/go signals, and/or overhanging structures. An overhanging structure is part of the environment's infrastructure that the vehicle 12 may drive under from time to time, such as without limitations, a tree, a bridge, and a parking structure. Captured images from the cameras 150, 152 and/or object detection information captured from a retractable sensor apparatus 120, such as a LiDAR sensor, is communicated from those sensors to the on-board computing device 310. The object detection information and/or captured images may be processed and analyzed by the autonomous vehicle navigation controller 320 to detect objects in proximity to the vehicle 12 such as for collision avoidance and/or navigation and motion control. Methods of moving a vehicle to avoid collision with objects including causing the brake controller to reduce speed of the vehicle or stop the vehicle, or causing the steering controller to move the vehicle away from the object before the vehicle reaches the object along the path. In addition or alternatively, the vehicle 12 may transmit any of the data to a remote server system (not shown) for processing. Any known or to be known technique for making an object detection based on sensor data and/or captured images can be used in the embodiments disclosed in this document. Other sensors may include curb feelers or curb detectors, by way of non-limiting example.

The on-board computing device 310 may include a retractable sensor controller (RSC) 321 configured to control the lift apparatus (LA) 130 to withdraw the retractable sensor apparatus 120 into a (system) housing 102 of the sensor system 100 so that: (i) the elevation of the retractable sensor apparatus 120 is less than the minimum clearance of an imminent structure; (ii) the lens structure 124 of the retractable sensor apparatus 120 may be cleaned; and/or (iii) retractable sensor apparatus 120 may be protected for safety and security. The retractable sensor controller (RSC) 321 is shown in communication, via wired or wireless communication link, with the autonomous vehicle navigation controller 320. However, controller 321 and controller 320 may the integrated into a single controller. In various embodiments, operational functions of controller 320 may be relied upon for decisions made by controller 321. The details of controlling the lift apparatus 130 will be described in relation to FIG. 4. An example of a minimum clearance will be described in relation to FIG. 10.

The above-disclosed features and functions, as well as alternatives, may be combined into many other different systems or applications. Various components (i.e., controllers 320, 321 and computing device 310) may be implemented in hardware or software or embedded software. Various presently unforeseen or unanticipated alternatives, modifications, variations or improvements may be made by those skilled in the art, each of which is also intended to be encompassed by the disclosed embodiments.

Figure 4:
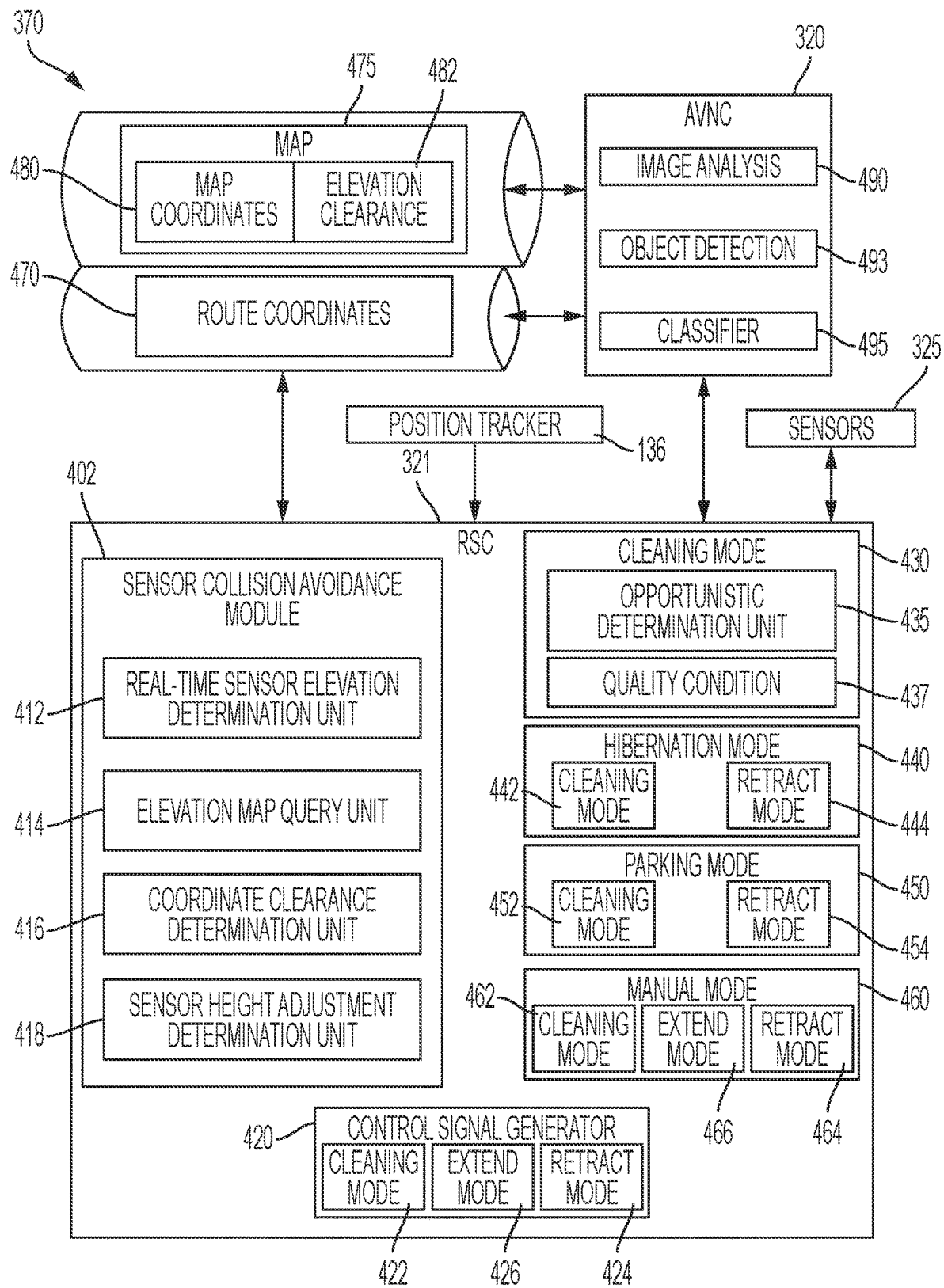
FIG. 4 is a block diagram of the retractable sensor controller and interfaces to control a lift apparatus of the roof-mounted retractable sensor system, in accordance with various embodiments of the present disclosure.

FIG. 4 is a block diagram of an example retractable sensor controller 321 and interfaces for controlling the lift apparatus 130 of the retractable sensor apparatus 120, in accordance with various embodiments. The retractable sensor controller 321 may interface with position tracker 136 coupled motor 134, for example. The retractable sensor controller 321 may interface with sensors 325 and autonomous vehicle navigation controller 320, for example. The retractable sensor controller 321 may interface with memory 370 to access route coordinates 470 and map database 475, hereinafter sometimes referred to as "map 475."

The retractable sensor controller 321 may be implemented using hardware, firmware, software or a combination of any of these. For instance, retractable sensor controller 321 may be implemented as part of a microcontroller, processor, and/or graphics processing units. The retractable sensor controller 321 may include a sensor collision avoidance module 402. The sensor collision avoidance module 402 may include or interface with a register and/or data store for storing data and programming instructions, which when executed, controls the retraction of the sensor body 123 into the sensor housing 126 by an amount to avoid a collision of the sensor body 123 with an overhanging structure. The instructions for retraction of the sensor body 123 may include or interface with a register and/or data store for storing data and programming instructions, which when executed, cause control of the motor 134 of the lift apparatus 130 to reduce the length of the lifting element 132 or cause the lowering of the sensor body 123 along a length of the lifting element 132. Therefore, the height, such as a vertical position, of the sensor body 123 is lowered or reduced which retracts the sensor body 123 into the sensor housing 126. For example, a telescopic type lift apparatus, the length of the one or more telescoping support posts, as shown in FIGS. 1A-1B, may be reduced.

The sensor collision avoidance module 402 may include a real-time sensor elevation determination unit 412. The elevation determination unit 412 may include or interface with a register and/or data store for storing data and programming instructions, which when executed, calculates or determines an elevation of the top surface 224 (FIG. 1B) of the sensor body 123. In some embodiments, the position tracker 136 may provide the tracked position data to the controller 321 and/or the sensor elevation determination unit 412. The elevation of the top surface 224 (see FIGS. 2A-2B) may be a function of its elevation above ground level and/or above the roof 15 of the vehicle 12, by way of non-limiting example. The sensor's elevation may be based on information provided by the lift apparatus 130. In various embodiments, the motor 134 may provide information representative of an elevation or height of the sensor body 123 relative to the roof 15.

The sensor collision avoidance module 402 may include an elevation map query unit 414. The controller 320 may produce control signals to control the navigation of the vehicle 12 as it travels a route or path. The path or route may be planned with a set of route coordinates 470 stored in memory 370. The elevation map query unit 414 may include or interface with a register and/or data store for storing data and programming instructions, which when executed, performs a query for elevation clearances 482 along the route. For example, query may include search for elevation clearances 482 based on map coordinates 480 of a map 475 that match route coordinates 470. The elevation clearance 482 of a structure will sometimes be referred to as a "minimum clearance." The structure associated with map coordinates 480 may be logged or flagged in the data store to identify whether an obstruction/structure has a variable elevation clearance. By way of non-limiting example, a tree may have a variable clearance since it has the ability to grow, while the entrance to a parking garage will have a fixed clearance. As should be understood, some structures are fixed in size and any portion overhanging the route would have a fixed elevation clearance. As should be understood, elevation clearances, whether fixed or variable, are associated with structures or obstructions which have a portion of the structure overhanging a portion of a road, street, or lane that the vehicle 12 would drive under.

The controller 320 may include an image analysis module 490, an object detection module 493 and classifier 495. As should be understood, the controller 320 may include other modules and components not described herein for the sake of brevity. By way of non-limiting example, the classifier 495 may classified an object of interest detected by the object detection module 493. For example, the object of interest may include a light signal devices at an imminent intersection on the path.

The image analysis module 490 may capture images representative of a real-time (current) elevation of an imminent structure having a variable clearance. The object detection module 493 may determine that the real-time (measured) elevation of the imminent structure changed and causes an update in the map 475. In some embodiments, controller 321 may cause controller 320 to perform image analysis to determine a current elevation of an imminent structure indicated as having a variable clearance. The controller 320 may update the elevation in the map 475 based on the image analysis by image analysis module 490 and determine a change in elevation at the coordinates. The stored elevation clearance in map 475 may be updated with the current measured elevation clearance.

The sensor collision avoidance module 402 may include a coordinate clearance determination unit 416. The coordinate clearance determination unit 416 may include or interface with a register and/or data store for storing data and programming instructions, which when executed, determines that a structure, associated with map coordinates 480, is ahead on an imminent path portion of the path that has a minimum clearance. The coordinate clearance determination unit 416 may include or interface with a register and/or data store for storing data and programming instructions, which when executed, determines that the minimum clearance is less than or equal to an elevation of the sensor body 123. The minimum clearance may be defined as the distance from the ground plane to the lowest elevation point of the structure overhanging a portion of the path.

The sensor collision avoidance module 402 may include a sensor height adjustment determination unit 418. The sensor height adjustment determination unit 418 may include or interface with a register and/or data store for storing data and programming instructions, which when executed, determines an amount of adjustment of the sensor body 123 to avoid a collision of the sensor body 123 with the structure, such as an amount that equals the difference between the current elevation of the top surface 224 of the sensor body 123 (see FIGS. 2A-2B) and the minimum clearance.

The retractable sensor controller 321 may include a control signal generator 420. The control signal generator 420 includes a cleaning mode 422, a retract mode 424, and an extend mode 426. The extend mode 426 may be activated based on a control signal from the on-board computing device 310, such as in response to the start of the engine/motor 302 of the vehicle, to cause the retractable sensor apparatus 120 to be deployed into an operational position or other intermediate position.

The control signal generated in the cleaning mode 422 causes retraction and/or elevation of the sensor body 123 for a cleaning cycle so that an exterior surface of the lens structure 124 can be cleaned. The control signal generated in the cleaning mode 422 may be a function of the height of the lens structure 124 and the current position of the lens structure 124. The cleaning mode 422 may include or interface with a register and/or data store for storing data and programming instructions, which when executed, generates a cleaning control signal to control the operation of the lifting element 132 of the retractable sensor apparatus 120 to clean lens structure 124 during a cleaning cycle.

The control signal generated in the retract mode 424 is a function of the current height of the top surface 224 of the sensor body 123, in various scenarios of operation, and causes a retraction the sensor body 123 by an amount into the sensor housing 126. In some variations, the retract mode 424 may fully retract the sensor body 123 into the sensor housing 126, as described in more detail below. It should be understood, that while the description provides for retraction of the sensor body 123 into the sensor housing 126, the sensor body 123 may only be lowered to avoid a collision without any portion of the lens structure 124 being within the sensor housing 126. The control signal generated in the extend mode 424 may be a function of the current height of the top surface 224 of the sensor body 123, in various scenarios of operation, and causes an extension of the sensor body 123 by an amount, such as to extend the sensor body 123 or portion thereof is above of the sensor housing 126. The amount of retraction or extension is a function of the current position of the sensor body 123 and lens structure 124.

The retract mode 424 may include or interface with a register and/or data store for storing data and programming instructions, which when executed, generates a retract control signal to control the operation of the lifting element 132 of the retractable sensor apparatus 120, prior to the vehicle 12 arriving at the determined imminent location (i.e., coordinates). The retract control signal effectuates automatic operation of the lifting element 132 to withdraw/retract the retractable sensor apparatus 120 so that the elevation of the retractable sensor apparatus 120 is less than the minimum clearance of the structure prior to the vehicle 12 arriving at the determined imminent location to avoid collision with the structure, by way of non-limiting example. The retract control signal is generated in accordance with a retract mode 424 of the control signal generator may partially or fully retract the sensor body 123 into the housing 126 for safety and security.

The extend mode 426 may include or interface with a register and/or data store for storing data and programming instructions, which when executed, generates an extend control signal to control the operation of the lifting element 132 of the retractable sensor apparatus 120, such as to move the sensor body 123 in an operational position or other intermediate positions out of the sensor housing 126. The extend control signal effectuates automatic operation of the lifting element 132 to extend the sensor body 123 so that the elevation, in some scenarios, positions the bottom edge 214 of the lens structure 124 above the highest plane of the housing 102. In the extend mode 426, the sensor body 123 may be removed for maintenance, repair or replacement.

A method of operating a vehicle having a roof-mounted sensor system 100 will now be described. One or more of the blocks of the method below may be performed in the order shown, in a different order or contemporaneously. One or more of the blocks of the method may be omitted in certain iterations. One or more of blocks may be added to the method or deleted from the method.

Figure 5A:
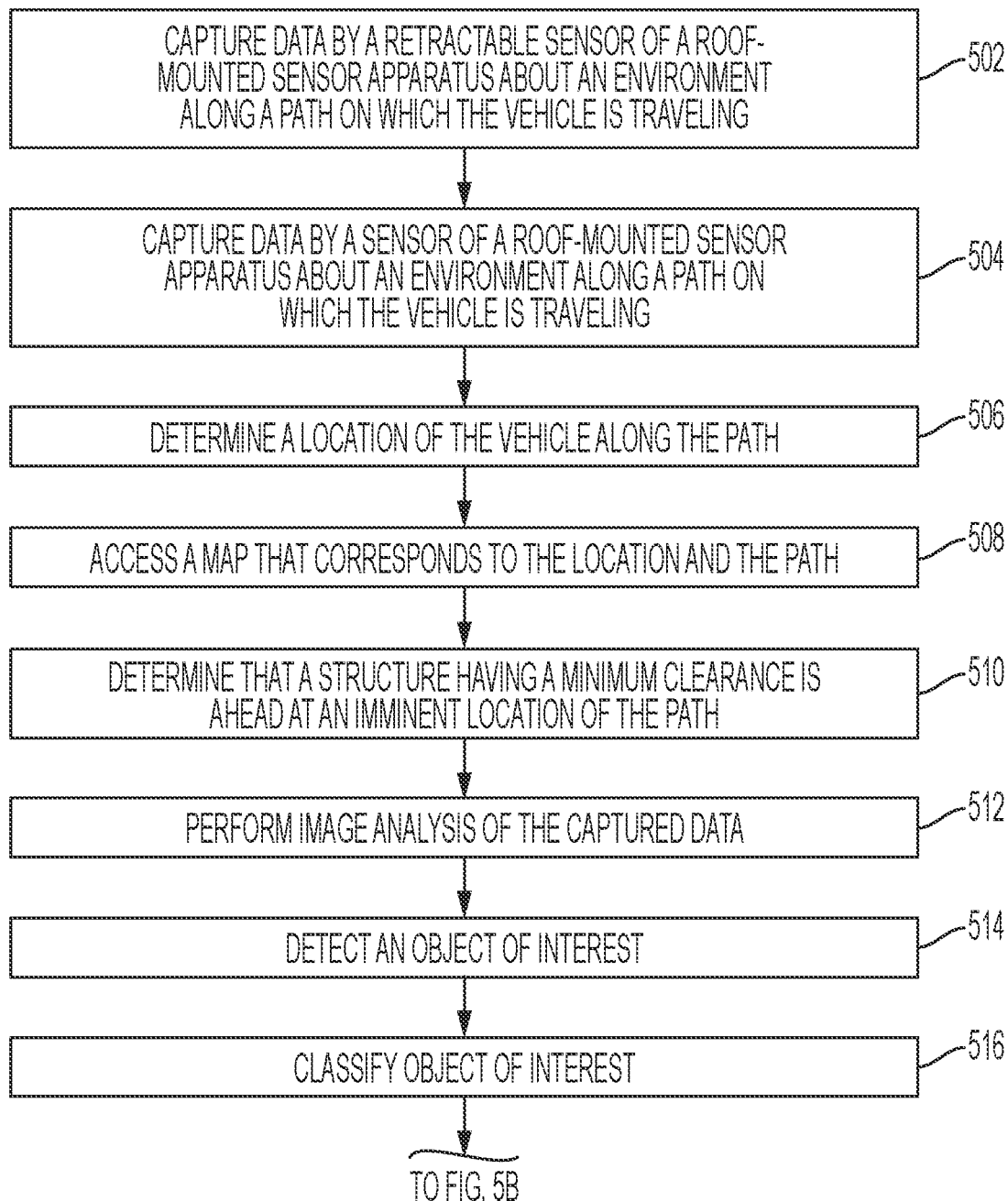
FIGS. 5A-5B are a flowchart of a method of operating a vehicle having a roof-mounted sensor apparatus, in accordance with various embodiments of the present disclosure.
Figure 5B:
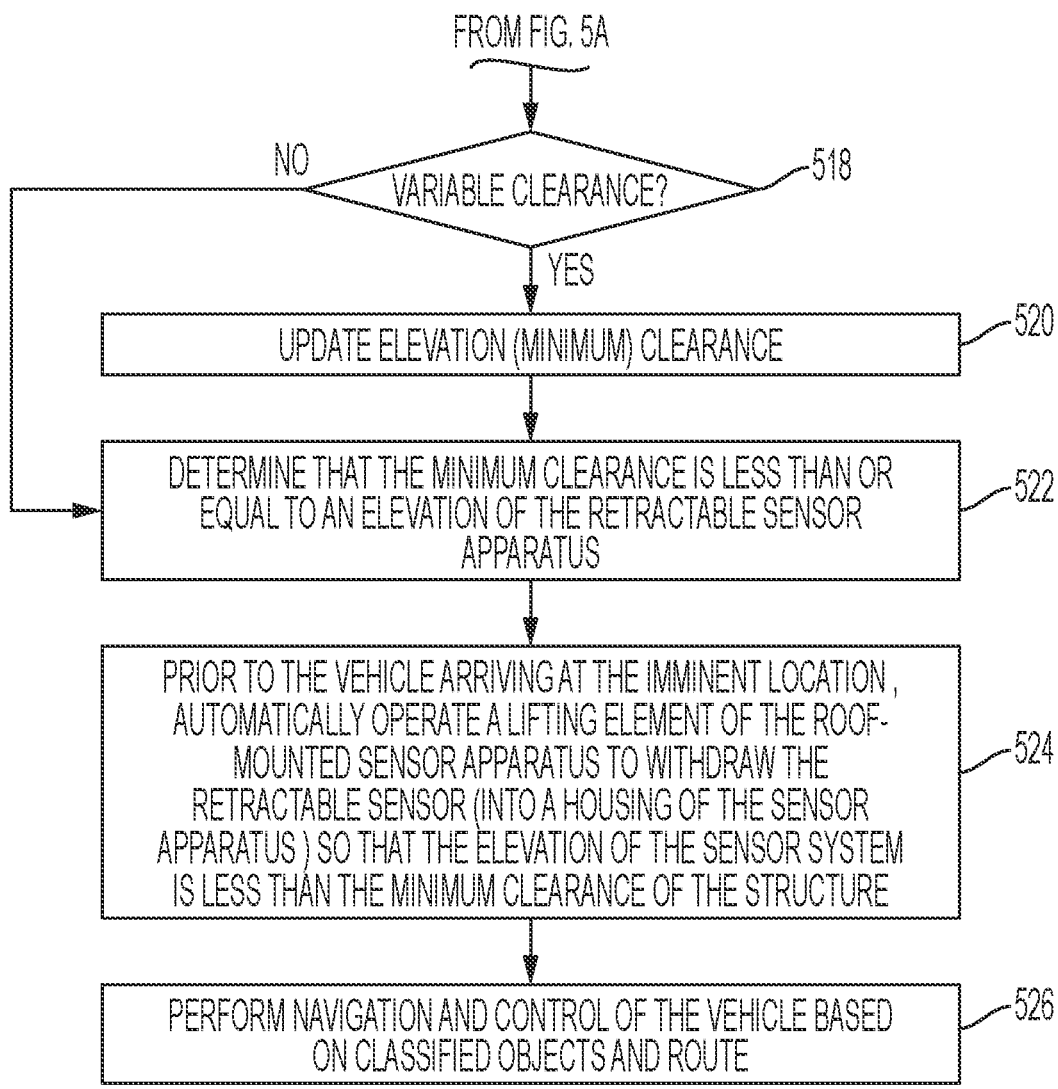

FIGS. 5A-5B are a flowchart of a method 500 of operating a vehicle 12 having a roof-mounted sensor system 100, in accordance with various embodiments. The operation of the vehicle 12 and sensors 325 may be controlled by the on-board computing device 310 which may include controllers 320 and controller 321. The method 500 may include using a roof-mounted retractable sensor apparatus 120 of the vehicle 12 to capture a first set of data about an environment or imminent path portion along a path on which the vehicle 12 is traveling (block 502). In various embodiments, the method 500 also may include using a second roof-mounted sensor of the vehicle 12, such as a camera 150, to capture a second set of data about the environment or imminent path portion of the path (block 504).

The method 500 may include, by a location sensor 360, determining a location of the vehicle 12 along the path (block 506). The method 500 may include accessing a map 475 that corresponds to the location and the path, by the controller 321 (block 508). The method 500 may include determining that a structure having a minimum clearance is ahead at an imminent location of the path, by the controller 321 or controller 320 (block 510). As should be understood, there may be several structures in or along an imminent path portion of the path. The controller 321 may receive or determine the clearances for all structures in the immediate path. In some embodiments, the sensor body 123 would be adjusted or retracted to avoid collision with a structure with the least minimum clearance.

The method 500 may include performing image analysis of the captured data, by controller 320 (block 512). The method 500 may include detecting an object of interest in the images (block 514) and classifying the object of interest (block 516), by the controller 320. The image analysis and object detection may employ feature extraction algorithms may include, without limitation, edge detection, corner detection, template matching, dynamic texture processing, segmentation image processing, motion detection, object tracking, background subtraction, object recognition and classification, etc.

In some instances the minimum clearance (i.e., elevation clearance) may be a variable clearance. The method 500 may include determining whether the minimum clearance is a variable elevation clearance (block 518). If the determination is "YES," the method 500 may include updating the elevation (minimum) clearance (block 520) to the detected clearance of the object and proceed to block 522. If the determination is "NO," the method 500 may proceed to block 522.

The updating process to update the elevation (minimum) clearance may include, using the image analysis (block 512) and object detection (block 514), for example, to measure the current elevation clearance and update the elevation clearance in memory. It understood, that the measured current elevation clearance may increase or decrease.

The method 500 may include determining that the minimum clearance is less than or equal to an elevation of the retractable sensor apparatus 120, by the controller 321 (block 522). In some variations, the minimum clearance may be an updated minimum clearance. The method 500 may include prior to the vehicle 12 arriving at the imminent location, using the controller 321 to automatically operate a lift apparatus 130 to withdraw or retract the sensor body 123 so that the elevation of the sensor system 100 is less than the minimum clearance of the structure (block 524). In various embodiments, the sensor body 123 is retracted all or part of its length into the sensor housing 126. The method 500 may include using the controller 320 to control navigation and motion of the vehicle 12 along the imminent path portion, after the sensor body 123 has been withdrawn or retracted (block 526). The amount of retraction serves to avoid collision with the imminent structure.

The retractable sensor controller 321 may operate in a continuous adjustment mode while the vehicle 12 is operational so that the height of the retractable sensor apparatus 120 can be adjusted autonomously.

Returning again to FIG. 4, the retractable sensor controller 321 may include a cleaning mode 430, a hibernation mode 440, a parking mode 450 and a manual mode 460. One or more of the hibernation mode 440, parking mode 450 and manual mode 460 may include a cleaning mode and a retract mode of operation. Each of the cleaning mode 430, the hibernation mode 440, the parking mode 450 and the manual mode 460 produces control signals to control the mode of the control signal generator 420. It should be understood, that the functions of the control signal generator 420 may be integrated, in whole or part, into each of the cleaning mode 430, the hibernation mode 440, the parking mode 450, the manual mode 460 and the collision avoidance module 402. The manual mode 460 may also include an extend mode 466.

The control signal generator may generate a cleaning control signal in response to receiving a control signal from the cleaning mode 430. The cleaning mode 430 may include or interface with a register and/or data store for storing data and programming instructions, which when executed, cause the control signal generator 420 to generate a cleaning control signal to cause the control signal generator to control the operation of the lifting element 132 of the retractable sensor apparatus 120 according to a cleaning process. The cleaning process may include automatically controlling the operation of the lifting element 132 of the retractable sensor apparatus 120 to withdraw the sensor body 123 from an operational position, such as shown in FIG. 1B, into the sensor housing 126 so that the cleaning element 128 is moved along the height H1 of the lens structure 124. The height H1 may be between top edge 212 and bottom edge 214. Then, the cleaning process may include automatically controlling the operation of the lifting element 132 to lifting the sensor body 123 back to the operational position, in some embodiments, so that the bottom edge 214 is above the sensor housing 126 or other intermediate position. The cleaning process may require activation of a cleaning element.

The cleaning process may including repeating the retraction and lifting (extending) of the sensor body 123 several times so that the cleaning element 128 passes back and forth over an exterior surface of lens structure 124, to complete a single cleaning cycle. The cleaning process may be performed for a period of time. The cleaning mode 430 may be initiated based on various factors, such as without limitation, weather conditions (i.e., precipitation) detected, a scheduled cleaning process and/or dirt detection on the lens structure 124. The precipitation may be detected by an environmental sensor 368. The dirt may be detected by the controller 320 as images are processed and analyzed, as will be described in more detail in relation to FIGS. 6 and 7.

The cleaning mode 430 may include opportunistic determination unit 435 which determines an opportunity to clean, by a cleaning cycle, a sensor 125 or lens structure 124. A cleaning opportunity may correspond to times when the retractable sensor apparatus 120 would not be needed to provide data into the pipeline for the controller 320 to generate navigation and motion control decisions. During the cleaning process, the cleaning element 128 performs a cleaning action on the lens structure 124 for a period of time. Accordingly, the opportunistic determination unit 435, when determining whether a cleaning opportunity exists, may take into consideration the estimated cleaning time to perform the cleaning process including the time to position the sensor body 123 adjacent to a cleaning element 128, the time to clean the lens structure 124 by moving the lens relative to the cleaning element 128, and the time to return the sensor body 123 to an operational position or other intermediate position of sensor body 123. The cleaning time would be compared to a predicted opportunity time period of the opportunity to determine whether the predicted opportunity time period is greater than or equal to the estimated cleaning time. If the estimated opportunity time period is less than the opportunity cleaning time, the opportunistic determination unit 435 initiates a cleaning cycle by sending a control signal to the control signal generator 420 to generate a cleaning control signal by the cleaning mode 422.

For example, the controller 320 may determine a predicted opportunity amount of time the vehicle will be stopped or have a zero speed due to the path being followed, the traffic conditions, traffic light classifications, etc. The predicted opportunity amount of time may be sent by controller 320 to controller 321. The controller 321 determines whether the predicted opportunity amount of time is a sufficient amount of time to perform a cleaning cycle based on the current status of the retractable sensor apparatus. If there is sufficient time, the controller 321 may perform a cleaning process according to a cleaning cycle.

In some embodiments, during the cleaning process, the sensor body 123 may be rotated in a clockwise or counter-clockwise direction, for example. The sensor body 123 may be mounted on a platform (not shown) which allows the sensor body 123 to rotate clockwise or counterclockwise. In various embodiments, the cleaning element 128 may include brushes, the cleaning process may include activating one or more brushes, such as when the lens is adjacent to the brushes.

The cleaning mode 430 may be initiated based on determining that a data or image quality condition 437 has been detected. For example, the controller 320 may determine a deterioration of an image or point cloud data captured by sensors 125 due to dirt on the lens structure 124. The controller 320 may determine an image quality condition of the captured image, such as by performing image analysis. The controller 320 may determine whether the condition can be improved by cleaning the lens structure, as described in relation to FIGS. 6 and 7. Accordingly, the controller 320 may notify the controller 321 of the quality condition so that a cleaning cycle may commence to clean the lens structure 124 by the cleaning element 128.

Figure 6:
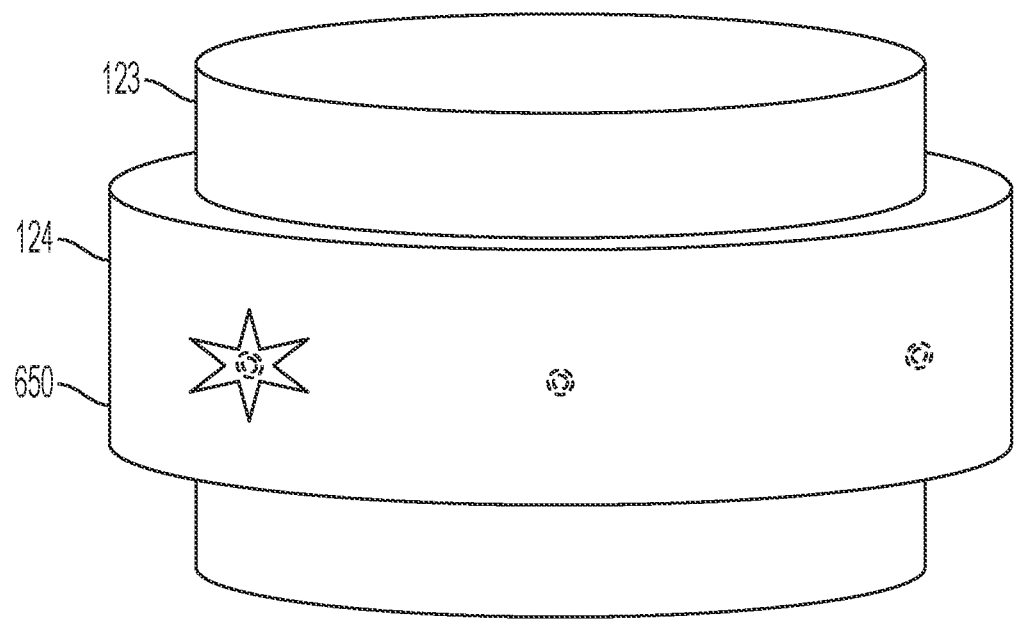
FIG. 6 is an example sensor body with a dirty lens.
Figure 7:
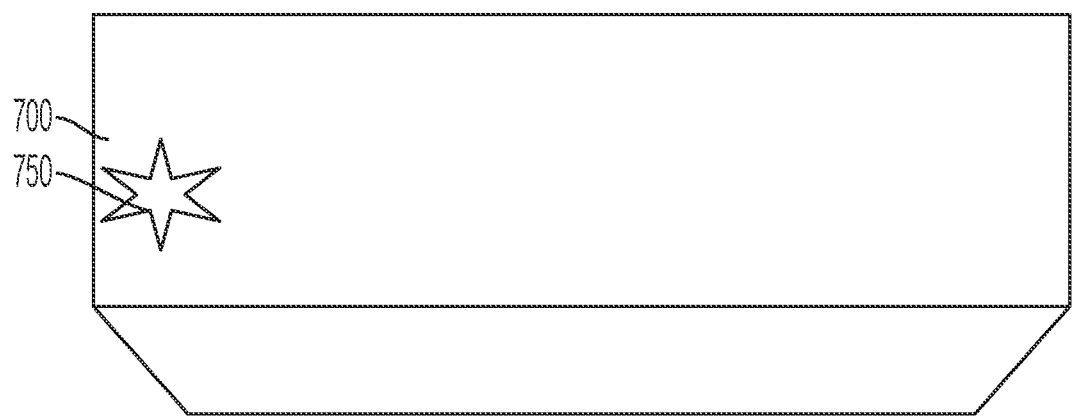
FIG. 7 is an example three-dimensional image detected with an anomaly.

FIG. 6 is an example sensor body 123 with dirt 650 on lens 124. The cleaning process using the cleaning element 128 is configured to remove dirt 650 from a surface of lens structure 124. FIG. 7 is an example three-dimensional image 700 detected with an anomaly 750 which may be representative of dirt 650. The controller 320 may perform analysis 490 of information captured by the retractable sensor apparatus 120, such as by determining that one or more of the LiDAR sensors are not receiving reflected signals. An anomaly may be resulting from a substance adhered on the lens structure 124, which prevents pulsed laser reflections from passing through the substance to the lens structure 124. Cleaning based on a quality condition 437 may employ a different cleaning cycle then opportunity-based cleaning cycles. By way of non-limiting example, after the cleaning cycle performed based on the quality condition 437 may perform an image analysis to detect if the lens structure 124 has been cleaned of the dirt. If the lens structure 124 was not cleaned, the subsequent cleaning cycle may be performed immediately or at the next opportunity.

Returning again to FIG. 4, the hibernation mode 440 may include a cleaning mode 442 and a retract mode 444. The hibernation mode 440 may include or interface with a register and/or data store for storing data and programming instructions, which when executed, cause the control signal generator 420 to generate a control signal to control the operation of the lifting element 132 of the (roof-mounted) retractable sensor apparatus 120 when the vehicle 12 is placed in a hibernation mode 440. The hibernation mode 440 may include automatically controlling the operation of the lifting element 132 to fully withdraw or retract the sensor body 123 into the sensor housing 126, in the retract mode 444. The retract mode 444 may provide for security and safety of the retractable sensor apparatus 120 by concealing the sensor body 123 within a protective housing (i.e., housing 102 or sensor housing 126). The retraction of the sensor body 123 into protective housing may allow the vehicle to be transported easily without special arrangement to the transport mediums (road transport, train cars, or containers).

The hibernation mode 440 may correspond to an idle period of the vehicle 12 where the vehicle may switch to a power saving mode (i.e., hibernation). The idle period may be determined by detecting zero speed for a period of time, as sensed by the speed sensor 338. The hibernation mode 440 may include or interface with a register and/or data store for storing data and programming instructions, which when executed, cause the control signal generator 420 to generate a clean control signal to control the operation of the lifting element of the retractable sensor apparatus 120 when the vehicle 12 is placed in a hibernation mode 440 to clean the lens structure 124. In the hibernation mode 440, the controller 321 may first cause the cleaning mode 442 to commence followed by the retract mode 444, where the sensor body 123 remains protected until the vehicle 12 is in motion again, for example.

The parking mode 450 may be initiated based on coordinates or image analysis performed by controller 320. The image analysis or coordinates may determine that the vehicle is parked in a parking lot or in a parking garage. In various embodiments, the parking mode 450 may be initiated by turning off the vehicle 12.

The parking mode 450 may include cleaning mode 452 and retract mode 454. In the parking mode 450, the retracted sensor apparatus 120 may prevent or deter vandalism or thief of the sensor. The parking mode 450 may include or interface with a register and/or data store for storing data and programming instructions, which when executed, cause the control signal generator 420 to generate a retract control signal to control the operation of the lifting element 132 of the (roof-mounted) retractable sensor apparatus 120 when the vehicle 12 is placed in a parking mode 450. The parking mode 450 may include automatically controlling the operation of the lifting element 132 of the retractable sensor apparatus 120 to fully withdraw or retract the sensor body 123 from an operational position, as shown in FIG. 1B, or other intermediate position into the sensor housing 126. In the cleaning mode 452. The parking mode 450 may include or interface with a register and/or data store for storing data and programming instructions, which when executed, cause the control signal generator 420 to generate a clean control signal to control the operation of the lifting element 132 of the retractable sensor apparatus 120 when the vehicle 12 is placed in a parking mode 450 to clean the lens structure 124 according to a cleaning cycle.

The controller 321 may detect activation of manual control of the retractable sensor apparatus and operate the retractable sensor apparatus in accordance with the detected manual mode 460. For example, based on detecting the activation of the manual control, the controller 321 may control the lifting element 132 to retract or extend the retractable sensor relative to the sensor housing 126. Activation may include a manual control button (not shown) that allow a user to initiate a cleaning cycle of the retractable sensor apparatus 120 in a cleaning mode 462, retract the sensor body 123 in the retract mode 464, and/or extend the sensor body 123 in the extend mode 466. The cleaning mode and retract mode has been previously described. The extend mode 466 includes controlling the lifting element 132 to lift the sensor body 123 out of the sensor housing 126.

FIGS. 8A-8B are examples of the retractable sensor apparatus 820 in retracted and operational positions, respectively, using with a helical support structure 833 as a lifting element 832. For a lift apparatus 830 with a helical support structure 833, the motor 834 may cause the sensor body 823 to move or rotate down a length of the helical support structure 833 so that the sensor body 823 is lowered into the interior cavity 106 (FIG. 1A). Conversely, the motor 834 may cause the sensor body 823 to move or rotate up a length of the helical support structure 833 so that the sensor body 823 is raised above the interior cavity 106 (FIG. 1A). In FIG. 8B, the retractable sensor apparatus 820 is fully extended and in an operational position. The lift apparatus 830 may include a position tracker 836 to track a position of the sensor body 823 or lens structure 124 (FIG. 2A). In the embodiment of FIGS. 8A-8B, the sensor body 823 rotates about the helical support structure 833, in one of clockwise or counterclockwise directions.

Figure 9:
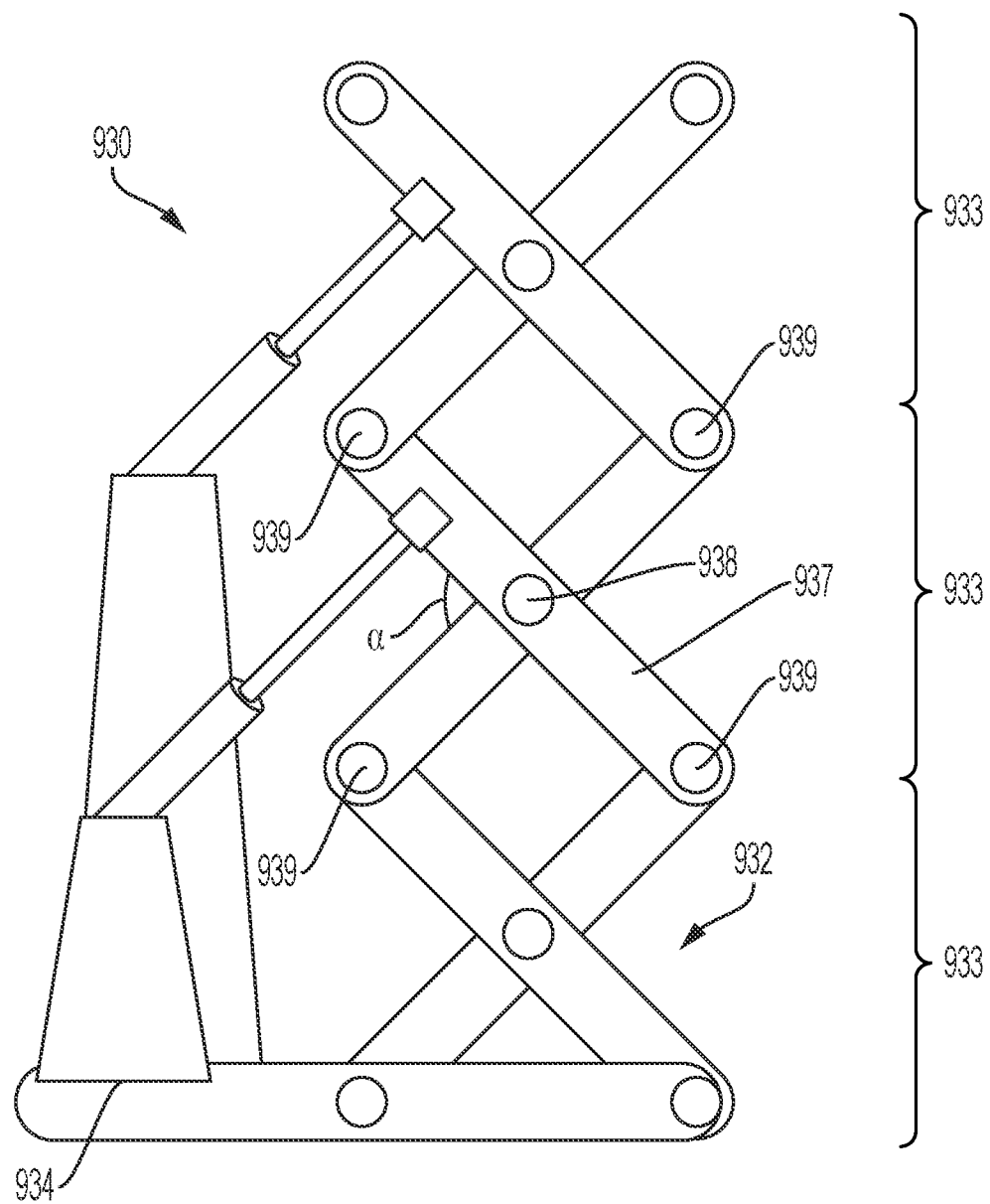
FIG. 9 is an example of a lift apparatus with a scissor lifting element.

FIG. 9 is an example of a lift apparatus 930 with a scissor lifting element 932. The scissor lifting element 932, shown in FIG. 9 includes scissor links 933 that are stacked on top of each other. The length of the scissor lifting element 932 increases to raise the sensor body or, alternately, reduces to lower the body. Each scissor link 933 includes scissor members 937 which crisscross each other and pivot about center pivot 938. The scissor link 933 includes link pivots 939. Each link pivot 939 is on free ends of the scissor members 937 to connect to free ends of adjacent scissor members 937 of an adjacent scissor link 933.

The lift apparatus 930 may include a lifting mechanism 934 to cause the scissor link 933 to expand or contact in unison with other links 933 of the scissor lifting element 932. To shorten a link 933, an angle of a scissor member 937 relative to a horizontal plane is reduced. To length a link 933, an angle of a scissor member 937 is increased relative to a horizontal plane. In other words, as the angle α between scissor members 937 of the same link is increased, the height or elevation of the link 933 increases. Furthermore, as the angle α between scissor members 937 of the same link is decreases, the height or elevation of the link 933 decreases.

Figure 10:
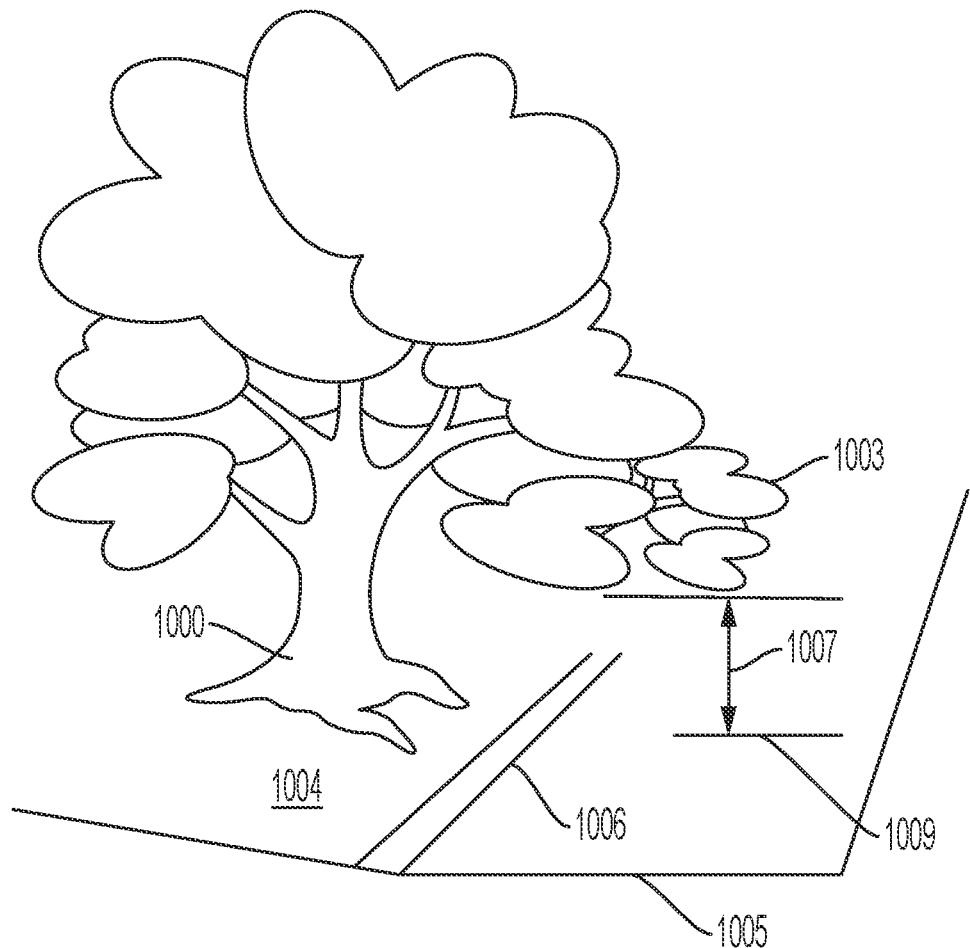
FIG. 10 is an example of a structure.

FIG. 10 is an example of a structure 1000 that a vehicle may encounter in an imminent path. By way of non-limiting example, the structure 1000 is a tree with an overhanging portion 1003 with a minimum clearance 1007. The tree is on a side path 1004 adjacent to a lane, street or road 1005. The road 1005 may have a curb 1006 such that the side path 1004 is slightly elevated above the ground plane 1009 of road 1005. The structure 1000 includes an overhanging portion 1003 which overhangs over a portion of the lane, street or road 1005. When the vehicle drives along lane, street or road 1005, the vehicle may be required to drive under the overhanging portion 1003. Thus, when the vehicle drives under the overhanging portion 1003, the sensor body 123 may need to be retracted.

In this example, the structure 1000 may have a variable (minimum) clearance. As the minimum clearance approaches a point that a collision cannot be avoided, the controller 320 may cause the route to be adjusted to avoid the structure 1000 until the minimum clearance is adjusted to an elevation level that allows a collision to be avoided.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server system that is in electronic communication with the vehicle via a wireless communication network.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Also, terms such as "top" and "bottom", "above" and "below", and other terms describing position are intended to have their relative meanings rather than their absolute meanings with respect to ground. For example, one structure may be "above" a second structure if the two structures are side by side and the first structure appears to cover the second structure from the point of view of a viewer (i.e., the viewer could be closer to the first structure).

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of operating a vehicle having a roof-mounted sensor apparatus, the method comprising:
by a retractable sensor of the roof-mounted sensor apparatus, capturing data about an environment along a path on which the vehicle is traveling;
by a location sensor of the vehicle, determining a location of the vehicle along the path; and
by a computing device of the vehicle:
accessing a map that corresponds to the location and the path,
determining that a structure having a minimum clearance is ahead at an imminent location on the path,
determining that the minimum clearance is less than or equal to an elevation of the retractable sensor,
prior to the vehicle arriving at the imminent location, automatically operating a lifting element of the roof-mounted sensor apparatus to withdraw the retractable sensor into a housing of the sensor apparatus so that the elevation of the retractable sensor is less than the minimum clearance of the structure,
determining a cleaning opportunity to clean a lens structure of the retractable sensor by:
estimating a cleaning time to perform a cleaning process;
identifying a period of time when the retractable sensor will not be needed to capture data; and
determining that the predicted period of time is greater than or equal to the estimated cleaning time; and
based on the determined cleaning opportunity, adjusting the lifting element to retract the retractable sensor into the housing so that the lens structure is adjacent to a cleaning element in the housing.

2. The method of claim 1, wherein the retractable sensor comprises a light detection and ranging (LiDAR) sensor.

3. The method of claim 1, further comprising:
by a camera of the vehicle, capturing images of the imminent path portion of the path;
by the computing device of the vehicle:
detecting an object of interest in the images,
classifying the object of interest, and
controlling motion of the vehicle along the imminent path portion to avoid a collision with the classified object of interest.

4. The method of claim 1, further comprising, by the computing device of the vehicle:
storing minimum clearances of structures having an overhanging portion over a road of a map.

5. The method of claim 4, further comprising, by the computing device of the vehicle:
identifying whether a structure on the path has a variable clearance;
performing a minimum clearance measurement of the identified structure, in response to determining the structure has the variable clearance; and
updating the stored minimum clearance with the measured minimum clearance.

6. The method of claim 1, further comprising, by the computing device of the vehicle:
determining a current location of the vehicle; and
based on the determined current location, adjusting the lifting element to retract or extend the retractable sensor relative to a sensor housing of the roof-mounted sensor apparatus.

7. The method of claim 1, further comprising, by the computing device of the vehicle:
determining that the data captured by the retractable sensor exhibits a quality condition indicating that the lens structure of the retractable sensor is dirty;
in response to determining that the data exhibits the quality condition, adjusting the lifting element to retract the retractable sensor into the housing; and
by a sensor cleaning element in the housing, cleaning the lens as the retractable sensor retracts into the housing.

8. The method of claim 1, further comprising, by the computing device of the vehicle:
when the lens structure is adjacent to the cleaning element in the housing, operating the lifting element to move the lens along the cleaning element.

9. The method of claim 1, further comprising, by the computing device of the vehicle:
determining a hibernation mode or a parked mode of the vehicle; and
based on determining the vehicle is in the hibernation mode or the parked mode, adjusting the lifting element to retract the retractable sensor into the housing.

10. The method of claim 9, wherein the adjusting of the lifting element comprises:
moving a lens of the retractable sensor adjacent to the cleaning element in the housing to clean the lens with the cleaning element.

11. A roof-mounted sensor system for an autonomous vehicle, the sensor system comprising:
a system housing that is configured to mount to a roof of a vehicle, wherein the housing comprises a top aperture and a front-facing aperture;
a retractable sensor apparatus including:
a retractable sensor body comprising a first sensor that, when positioned in an operational position, extends from the top aperture out of the housing,
a lift apparatus that is operational to move the retractable sensor body between the operational position and a retracted position that is at least partially within the housing, the lift apparatus comprising stacked scissor links, and
a motor that is operable to operate the lift apparatus;
a sensor housing that is formed within the system housing and configured to house the retractable sensor body and the lift apparatus;
a cleaning element mounted to an interior surface of the sensor housing;
a retractable sensor controller communicatively coupled to the retractable sensor apparatus, the controller configured to:
access a map that corresponds to a location on a path driven by the autonomous vehicle,
determine that a structure having a minimum clearance is ahead at an imminent location of the path,
determine that the minimum clearance is less than or equal to an elevation of the retractable sensor body, and
prior to the vehicle arriving at the imminent location, cause the motor to automatically operate the lift apparatus to withdraw the retractable sensor body into the sensor housing so that the elevation of the retractable sensor body is less than the minimum clearance of the structure;

wherein the controller is further configured to determine a cleaning opportunity to clean a lens structure of the retractable sensor apparatus by:
  estimating a cleaning time to perform a cleaning process;
  identifying a period of time when the retractable sensor apparatus will not be needed to capture data; and
  determining that the predicted period of time is greater than or equal to the estimated cleaning time;
wherein the controller is further configured to, based on the determined cleaning opportunity, adjust the lift apparatus to retract the retractable sensor body into the sensor housing so that the lens structure is adjacent to the cleaning element in the housing; and
operate the lift apparatus to move the lens structure along the cleaning element; and
a second sensor comprising a camera that is positioned within the system housing and configured to capture images through the front-facing aperture.

12. The roof-mounted sensor system of claim 11, wherein the cleaning element is positioned to clean the retractable sensor body when the retractable sensor body is moved from the operational position to the retracted position.

13. The roof-mounted sensor system of claim 12, wherein the retractable sensor body comprises a light detection and ranging (LiDAR) sensor.

14. The roof-mounted sensor system of claim 13, wherein the cleaning element comprises one or more of the following:
  a squeegee that is positioned to contact and scrape against a lens structure of the LiDAR sensor when the LiDAR sensor is moved between the operational position and the retracted position; or
  a brush that is positioned to contact and brush the lens structure of the LiDAR sensor when the LiDAR sensor is moved between the operational position and the retracted position.

15. The roof-mounted sensor system of claim 12, wherein the cleaning element comprises a rotatable brush.

16. The roof-mounted sensor system of claim 11, wherein the retractable sensor controller is further configured to:
  determine a hibernation mode or a parked mode of the vehicle; and
  based on determining that the vehicle is in the hibernation mode or the parked mode, adjust the lift apparatus to retract the retractable sensor body into the sensor housing.

17. The roof-mounted sensor system of claim 11, wherein the retractable sensor controller is further configured to:
  detect activation of manual control of the retractable sensor apparatus; and
  based on detecting the activation of the manual control, control the lift apparatus to retract or extend the retractable sensor body relative to the sensor housing.

* * * * *